United States Patent
Yoshida (10) Patent No.: US 7,400,428 B2
(45) Date of Patent: Jul. 15, 2008

(54) COLOR FACSIMILE APPARATUS AND METHOD OF CONTROLLING COMMUNICATION THEREOF

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 951 days.

(21) Appl. No.: 10/684,385

(22) Filed: Oct. 15, 2003

(65) Prior Publication Data

US 2004/0114196 A1   Jun. 17, 2004

(30) Foreign Application Priority Data

Oct. 15, 2002   (JP) .............................. 2002-300976

(51) Int. Cl.
H04N 1/00   (2006.01)
(52) U.S. Cl. .................. 358/426.07; 358/539; 358/401; 358/403; 358/438
(58) Field of Classification Search ................. 358/500, 358/501, 505, 539, 400, 401, 403, 426.07, 358/426.06, 426.1, 438, 448, 1.9, 1.2; 348/210.99, 348/263, 266, 699; 455/557; 709/206
See application file for complete search history.

(56) References Cited

U.S. PATENT DOCUMENTS

| | | | |
|---|---|---|---|
| 4,729,033 A | | 3/1988 | Yoshida ....................... 358/257 |
| 5,724,579 A | * | 3/1998 | Suzuki ........................ 358/403 |
| 5,748,334 A | | 5/1998 | Yoshida ....................... 358/435 |
| 5,973,755 A | * | 10/1999 | Gabriel ........................ 348/699 |
| 6,118,552 A | * | 9/2000 | Suzuki et al. ................ 358/539 |
| 6,570,677 B2 | | 5/2003 | Yoshida ....................... 358/434 |
| 6,791,710 B1 | * | 9/2004 | Bannai ......................... 358/1.2 |
| 7,016,076 B2 | * | 3/2006 | Izumi .......................... 358/539 |

(Continued)

FOREIGN PATENT DOCUMENTS

| | | |
|---|---|---|
| JP | 06-125470 | 5/1994 |
| JP | 07-203222 | 8/1995 |
| JP | 2000-059597 | 2/2000 |
| JP | 2002-218148 | 8/2002 |
| JP | 2003-037741 | 2/2003 |

OTHER PUBLICATIONS

ITU-T T.30: Section 5.3.6.2.3.*

*Primary Examiner*—Twyler L. Haskins
*Assistant Examiner*—Nicholas C Pachol
(74) *Attorney, Agent, or Firm*—Fitzpatrick, Cella, Harper & Scinto (57) ABSTRACT

The present invention makes it possible to transmit an image, which has been captured as by a digital camera, in the form of a file by facsimile communication. To this end, if an X bit of a FIF (Facsimile Information Field) from a receiving machine is ON, the facsimile apparatus judges that the receiving machine has functions for JPEG-receiving in sYCC color space and for receiving an image that has been captured by a digital camera and stored on a memory card. If transmission of image files on a memory card has been specified, those image files are transmitted successively when the X bit of the FIF from the receiving machine is ON. Even if there is a main-scan pixel-number change or a color-monochrome change, a PPS-MPS signal is transmitted and the individual image files are transmitted.

8 Claims, 8 Drawing Sheets

U.S. PATENT DOCUMENTS

| | | | |
|---|---|---|---|
| 7,046,394 B2 * | 5/2006 | Yasunobu | 358/1.9 |
| 7,206,812 B2 * | 4/2007 | Kogure et al. | 709/206 |
| 2002/0025835 A1 * | 2/2002 | Izumi | 455/557 |
| 2002/0051220 A1 * | 5/2002 | Tanaka et al. | 358/400 |
| 2002/0089702 A1 * | 7/2002 | Yoshitani et al. | 358/448 |
| 2002/0093698 A1 * | 7/2002 | Kagawa | 358/505 |
| 2003/0142329 A1 * | 7/2003 | Yoshida | 358/1.9 |
| 2004/0075850 A1 * | 4/2004 | Yoshida | 358/500 |

* cited by examiner

FIG. 2

| FIF | DIS/DTC SIGNAL | DCS SIGNAL |
|---|---|---|
| BIT 68 | INDICATES WHETHER OR NOT FUNCTION FOR RECEIVING JPEG-ENCODED INFORMATION IN Lab COLOR SPACE IS AVAILABLE | SPECIFIES TRANSMISSION OF JPEG-ENCODED INFORMATION IN Lab COLOR SPACE |
| BIT 69 | INDICATES WHETHER OR NOT FUNCTION FOR RECEIVING FULL-COLOR INFORMATION IN Lab COLOR SPACE IS AVAILABLE | SPECIFIES TRANSMISSION OF FULL-COLOR INFORMATION IN Lab COLOR SPACE |
| BIT X | INDICATES WHETHER OR NOT FUNCTION FOR RECEIVING JPEG-ENCODED INFORMATION IN sYCC COLOR SPACE IS AVAILABLE | SPECIFIES TRANSMISSION OF JPEG-ENCODED INFORMATION IN sYCC COLOR SPACE |

COLOR FACSIMILE APPARATUS AND METHOD OF CONTROLLING COMMUNICATION THEREOF

FIELD OF THE INVENTION

This invention relates to facsimile communication and, more particularly, to communication of JPEG images in facsimile communication.

BACKGROUND OF THE INVENTION

Facsimile machines capable of communicating color information operate in accordance with ITU-T Recommendations T.30, T.4, T.81 and T.42, and the color images transmitted thereby use Lab color space.

The popularization of digital cameras in recent years has been accompanied by growing demand for the transmission of information, which has been captured by such cameras, using existing facsimile protocols.

The color space used in a digital camera is sYCC color space and not Lab. Naturally, therefore, there is desire for a protocol that will transmit JPEG-encoded information in sYCC color space as is.

However, when JPEG full-color transmission of sYCC color space is considered, this basically is not transmission of color-document information but rather of file information that has been obtained by photography using a digital camera and stored on a removable storage medium such as a compact flash card. In such case the number of pixels of the image in the main-scan direction and the number of pixels thereof in the sub-scan direction are reported to the receiving machine by the header of a JPEG file without negotiating the transmission resolution and document size, as when color-document information in Lab color space is transmitted. This makes it necessary to clarify the protocol used when transmitting images and image information that have been stored on a compact flash card.

SUMMARY OF THE INVENTION

Accordingly, an object of the present invention is to so arrange it that an image file that has been obtained by capturing an image using a digital camera is transmitted by facsimile in an appropriate manner.

According to the present invention, the foregoing object is attained by providing a communication control method in a facsimile apparatus that is capable of communicating color information, comprising the steps of: receiving, in a preliminary procedure, notification information from a receiving machine, the notification information indicating whether the receiving machine has a function for receiving JPEG-encoded information in Lab color space, whether it has a function for receiving full-color information in Lab color space, and whether it has a function for receiving JPEG-encoded information in sYCC color space; notifying the receiving machine of an image to be transmitted being JPEG-encoded in Lab color space, full-color information in Lab color space, or JPEG-encoded information in sYCC color space; and if a JPEG file in sYCC color space stored on a removable storage medium has been specified as an image to be transmitted, an image in sYCC color space that has been stored on the removable storage medium is transmitted to the receiving machine as a file on the condition that the received notification information indicates the existence of the function for receiving JPEG-encoded information in sYCC color space.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

A preferred embodiment of the present invention will now be described in detail with reference to the accompanying drawings.

Figure 1:
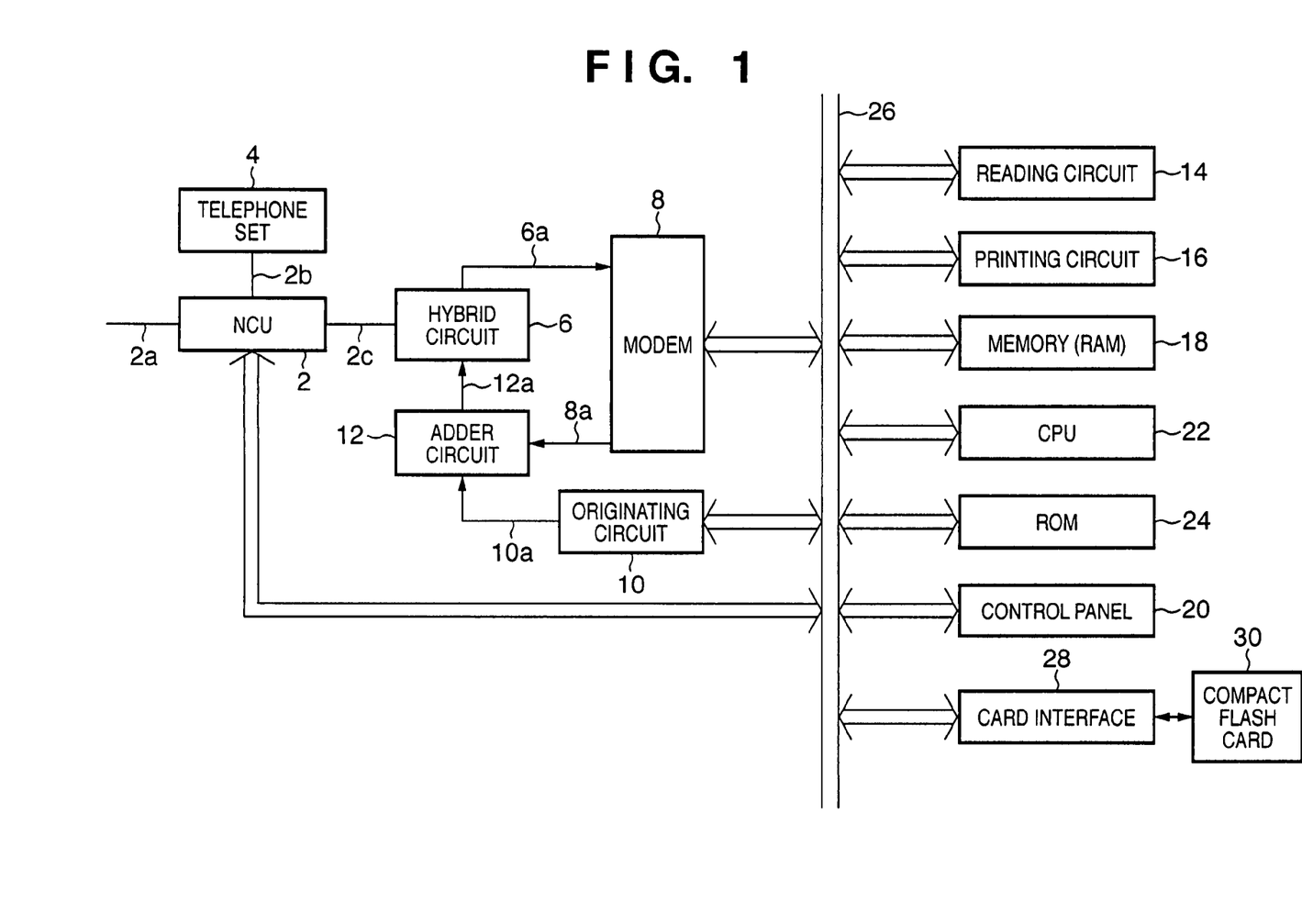
FIG. 1 is a block diagram illustrating the structure of a facsimile apparatus according to an embodiment of the present invention.

FIG. 1 is a block diagram illustrating the structure of a facsimile apparatus according to an embodiment of the present invention.

As shown in FIG. 1, an NCU (network control unit) 2 effects a connection to the terminal of a line in order for a telephone network to be used in data communication or the like, controls the connection of a telephone switching network, effects a changeover to a data communication line and maintains the loop. Further, in response to control from a bus 26, the NCU 2 connects a telephone line 2a to a telephone set (turns CML off) or connects the telephone line 2a to a facsimile apparatus (turns CML on). It should be noted that the telephone line 2a has been connected to the side of a telephone set 4 in FIG. 1.

A hybrid circuit 6 separates signals into a transmit signal and receive signal, sends a transmit signal from an adder circuit 12 to the telephone line 2a via the NCU 2, receives a signal from the side of the communicating party via the NCU 2 and sends the signal to a modem 8 via a signal line 6a.

The modem 8 performs modulation and demodulation that is based upon ITU-T Recommendations V.8, V.21, V.27ter, V.29, V.17 and V.34. Each transmission mode is specified by control on bus 26. A transmit signal from the bus 26 is input to the modem 8, which then outputs modulated data to a signal line 8a. Further, a receive signal being output on the signal line 6a is input to the modem 8, which then outputs demodulated data to the bus 26.

An originating circuit 10 accepts input of telephone-number information in response to a signal from the bus 26 and outputs a STMF select signal to a signal line 10a. The information on signal line 8a and the information on signal line 10a is input to the adder circuit 12, which proceeds to add this information and output the result to a signal line 12a.

A reading circuit (image scanner, etc.) 14, which is capable of reading color, outputs the read data to the bus 26. A printing circuit 16, which is capable of printing in color, prints information, which is being output on the bus 26, line by line in succession on a printing medium such as printing paper. A memory circuit 18 is a working memory (RAM). The memory circuit 18 is used to store the raw information of read data or encoded information, and to store received information or encoded information, etc., via the bus 26. A control panel 20 includes keys for single-button dialing, keys for abbreviated dialing, numeric keys, a * key, a # key, a start key, a stop key, a set key, a key for selecting transmission of file information, a key for selecting transmission of color information, and function keys. Key information obtained by pressing these keys is output to the bus 26. The control panel 20 further includes a display unit, which is equipped with a touch-sensitive panel, for entering and displaying information and messages being output on the bus 26. A CPU (central processing unit) 22 performs overall control of the facsimile apparatus. This includes execution of a facsimile-transmission control procedure. The control program of the CPU 22 is stored in a ROM 24.

A card interface 28 has an insertion slot for inserting a card 30 [e.g., a compact flash card (removable storage medium) on which information captured by a digital camera has been stored], and a connector for effecting a connection to the interior of the interface.

It should be noted that the memory card loaded into the digital camera may take on various forms other than that described above. In order to connect any of these cards, it is desired that a plurality of interfaces conforming to respecting ones of the card types be provided. However, if installation space is a problem, it would suffice to adopt a general-purpose PCMCIA interface as the card interface 28. The reason for this is that memory cards of various types can be accommodated and it is possible to use a conversion card that allows cards to be converted as a PCMCIA card.

Figure 2:
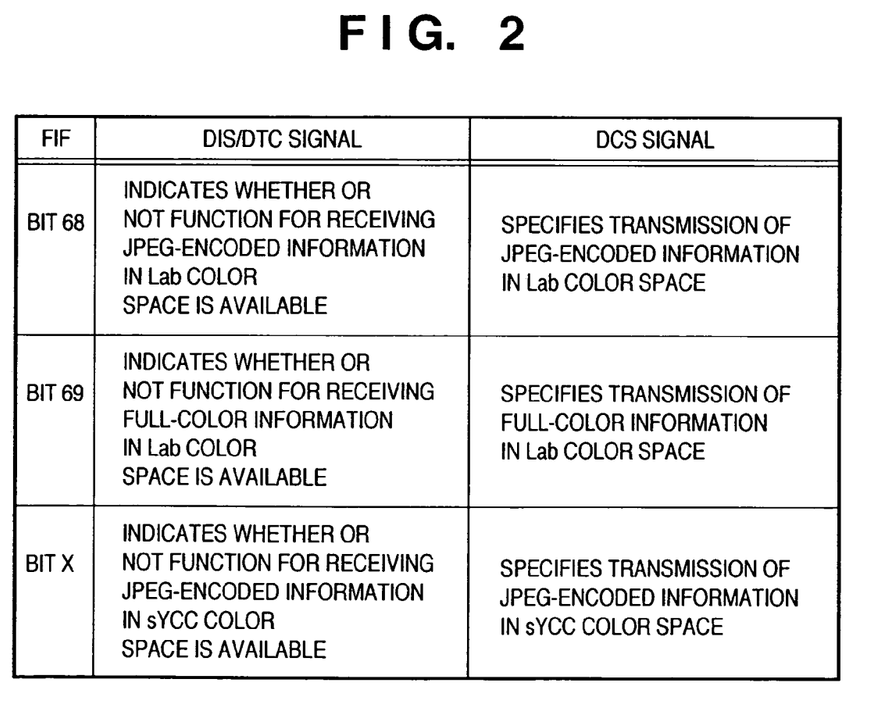
FIG. 2 is a diagram illustrating a specific example of FIF information in DIS/DTC and DCS signals in this embodiment.

FIG. 2 shows color-related bit information and information (FIF bit position and meaning thereof) added anew to ITU-T Recommendation T.30 in this embodiment.

As shown in FIG. 2, whether a function for receiving JPEG-encoded information in Lab color space is available is reported by bit 68 of the FIF (Facsimile Information Field) in a DIS (Digital Information Signal)/DTC (Digital Transmit Command), and whether JPEG-encoded information in Lab color space is to be transmitted or not is specified by bit 68 of the FIF in a DCS (Digital Command Signal). Further, whether a function for receiving full-color information in Lab color space is available is reported by bit 69 of the FIF in the DIS/DTC, and whether full-color information in Lab color space is to be transmitted or not is specified by bit 69 of the FIF in the DCS. Whether a function for receiving JPEG-encoded information in sYCC color space is available is reported by bit X of the FIF in the DIS/DTC, and whether JPEG-encoded information in sYCC color space is to be transmitted or not is specified by bit X of the FIF in the DCS.

In FIG. 1, a program relating to transmit/receive functions has been stored in the ROM 24. In relation to this embodiment, the stored program functions as the following means in a facsimile apparatus that is capable of communicating color information: means for notifying a transmitting machine from a receiving machine, in a preliminary procedure, of whether the receiving machine has a function for receiving JPEG-encoded information in Lab color space; means for notifying the transmitting machine from the receiving machine, in the preliminary procedure, of whether the receiving machine has a function for receiving full-color information in Lab color space; means for notifying the transmitting machine from the receiving machine, in the preliminary procedure, of whether the receiving machine has a function for receiving JPEG-encoded information in sYCC color space; means for designating, from the transmitting machine to the receiving machine, transmission of JPEG-encoded information in Lab color space; means for designating, from the transmitting machine to the receiving machine, transmission of full-color information in Lab color space; means for designating, from the transmitting machine to the receiving machine, transmission of JPEG-encoded information in sYCC color space; means for selecting color transmission on the side of the transmitting machine; and means for designating file transmission on the side of the transmitting machine.

Also stored is a program for changing a procedure signal when information representing a plurality of files is transmitted and when information representing a plurality of images is transmitted.

More specifically, when information representing a plurality of files on memory card 30 is transmitted on the side of the transmitting machine, the transmitting machine transmits a PPS-MPS signal regardless of whether or not the number of pixels of the transmitted file information in the main-scan direction thereof changes. When information representing a plurality of images is transmitted, the transmitting machine transmits a PPS-EOM signal if the number of pixels of the transmitted image information in the main-scan direction thereof changes and transmits the PPS-MSP signal if the number of pixels of the transmitted image information in the main-scan direction thereof does not change.

When image information is transmitted following the transmission of file information on the side of the transmitting machine, the transmitting machine transmits the PPS-EOM signal. When file information is transmitted following the transmission of image information on the side of the transmitting machine, the transmitting machine transmits the PPS-EOM signal.

The processing procedure for the above operation is stored in ROM 24. This processing will now be described in detail with reference to FIGS. 3 to 7.

Figure 3:
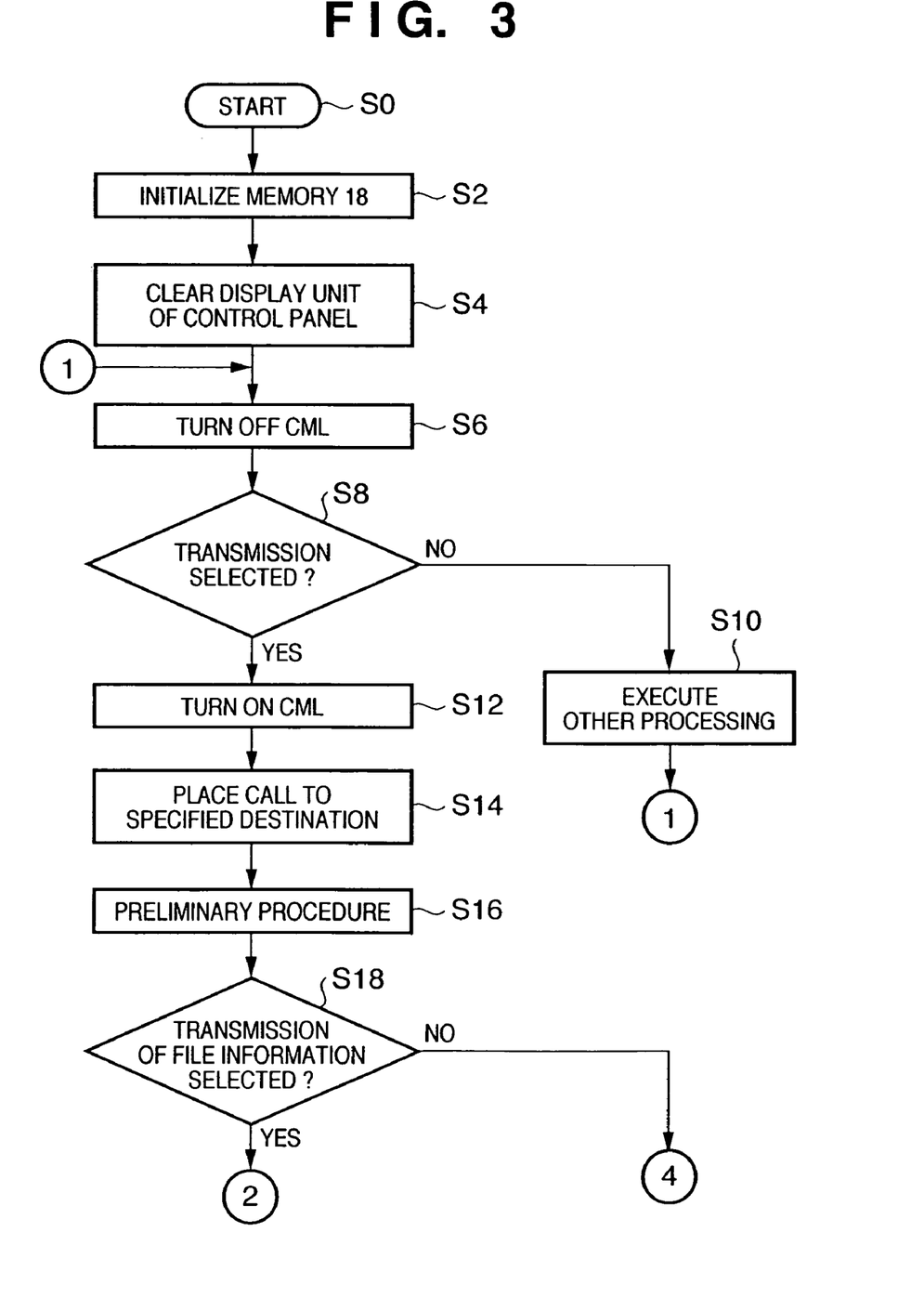
FIG. 3 is a flowchart illustrating processing for facsimile transmission according to this embodiment.

Processing starts at step S0 in FIG. 3 and the memory 18 is initialized via the bus 26 at step S2. The display unit on the control panel 20 is cleared via the bus 26 at step S4, and the CML of NCU 2 is turned off via the bus 26 at step S6.

Next, it is determined at step S8 whether facsimile transmission has been selected. If the decision rendered is "YES", control proceeds to S12; if the decision is "NO", then control proceeds to S10 and other processing is executed.

If transmission is specified, control proceeds to step S12, where the CML of NCU 2 is turned on via the bus 26.

Next, at step S14, a call is placed to the specified destination using the originating circuit, then a preliminary procedure is implemented in negotiation with the apparatus of the other communicating party. Notification of functions on the transmitting side and notification of functions on the receiving side, which are illustrated in FIG. 2, is given in accordance with this preliminary procedure.

When control proceeds to step S18 (after performance of the preliminary procedure in step S16), information is entered from the control panel and it is determined whether transmission of file information or transmission of a document image has been selected. Control proceeds to step S20 if it is determined that file transmission (transmission of an image file in the removable storage medium) has been selected ("YES" at step S18). If the decision rendered is "NO", control proceeds to step S32.

Figure 4:
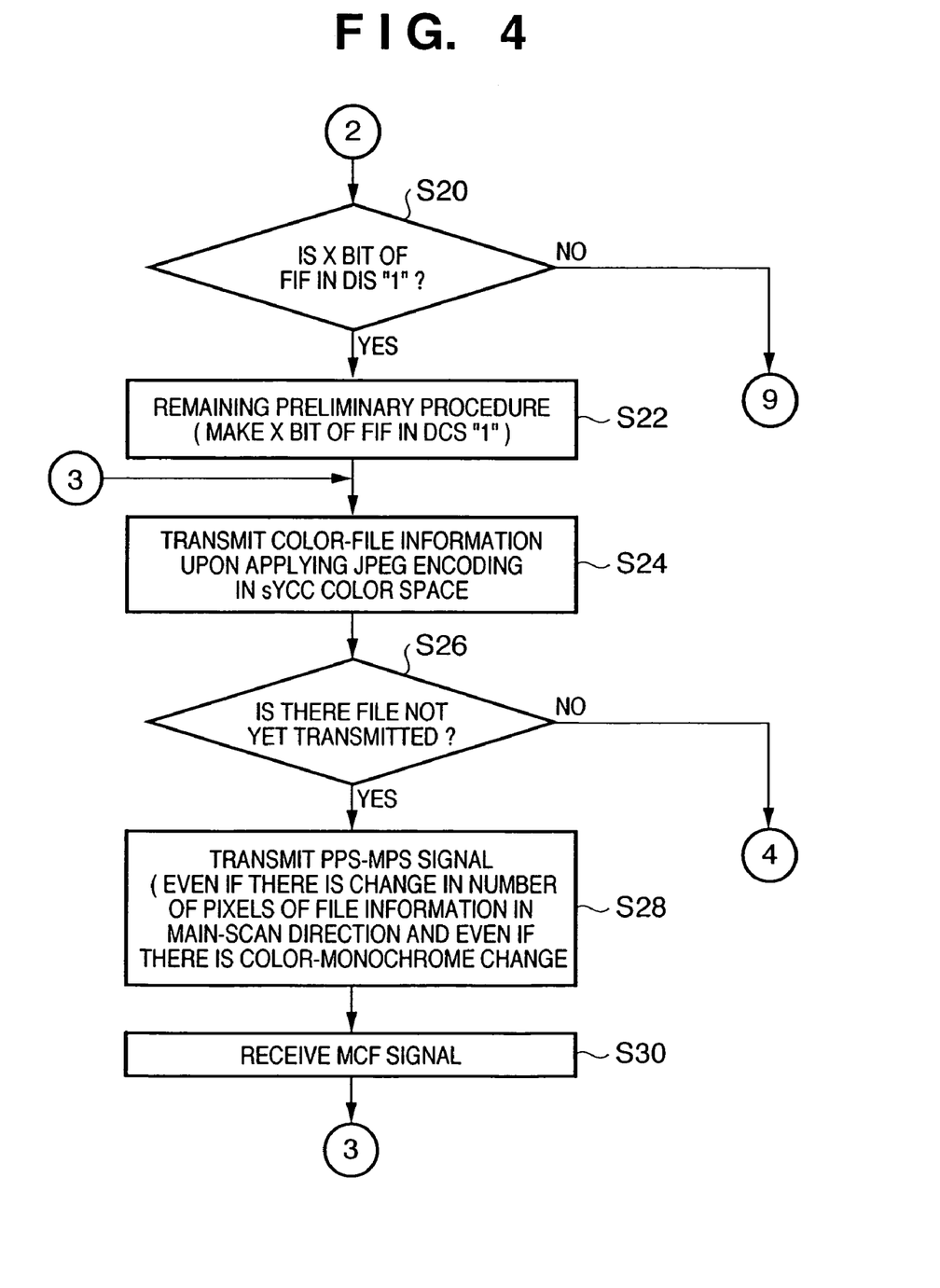
FIG. 4 is a flowchart illustrating processing for facsimile transmission according to this embodiment; DIS/DTC and DCS signals in this embodiment.

At step S20 in FIG. 4, it is determined whether the X bit of the FIF in the DIS is "1" (i.e., whether the receiving side is capable of receiving in sYCC color space). Control proceeds to step S22 if a "YES" decision is rendered and to step S40 if a "NO" decision is rendered.

If control proceeds to step S22, the remaining part of the preliminary procedure is executed. Here the X bit of the FIF in the DCS is made "1", thereby reporting file transmission (transmission of the file of a color image that has been captured as by a digital camera).

Next, at step S24, color-file information that has been stored on the compact flash card 30 inserted into the card interface 28 is transmitted upon being subjected to JPEG encoding in sYCC color space.

It is determined at step S26 whether there is file information not yet transmitted. Control proceeds to S28 if the answer is "YES" and to step S32 if the answer is "NO".

The PPS-MSP signal is transmitted at step S28. Here a characterizing feature of this embodiment is that the PPS-MPS signal is transmitted even if the number of pixels of the file information in the main-scan direction thereof changes and even if there is a change in color and monochrome attributes. Control then proceeds to step S30, where an MCF signal is received.

If control proceeds to step S32, it is determined whether there is a document to be transmitted (e.g., whether there is a signal from a sensor that senses whether or not a document has been placed on the image reader). Control proceeds to S34 if the answer is "YES" and to step S54 if the answer is "NO".

If control proceeds to step S34, the PPS-EOM signal is transmitted, the MCF signal is received at step S36 and the DIS signal is received at step S38.

Figure 5:
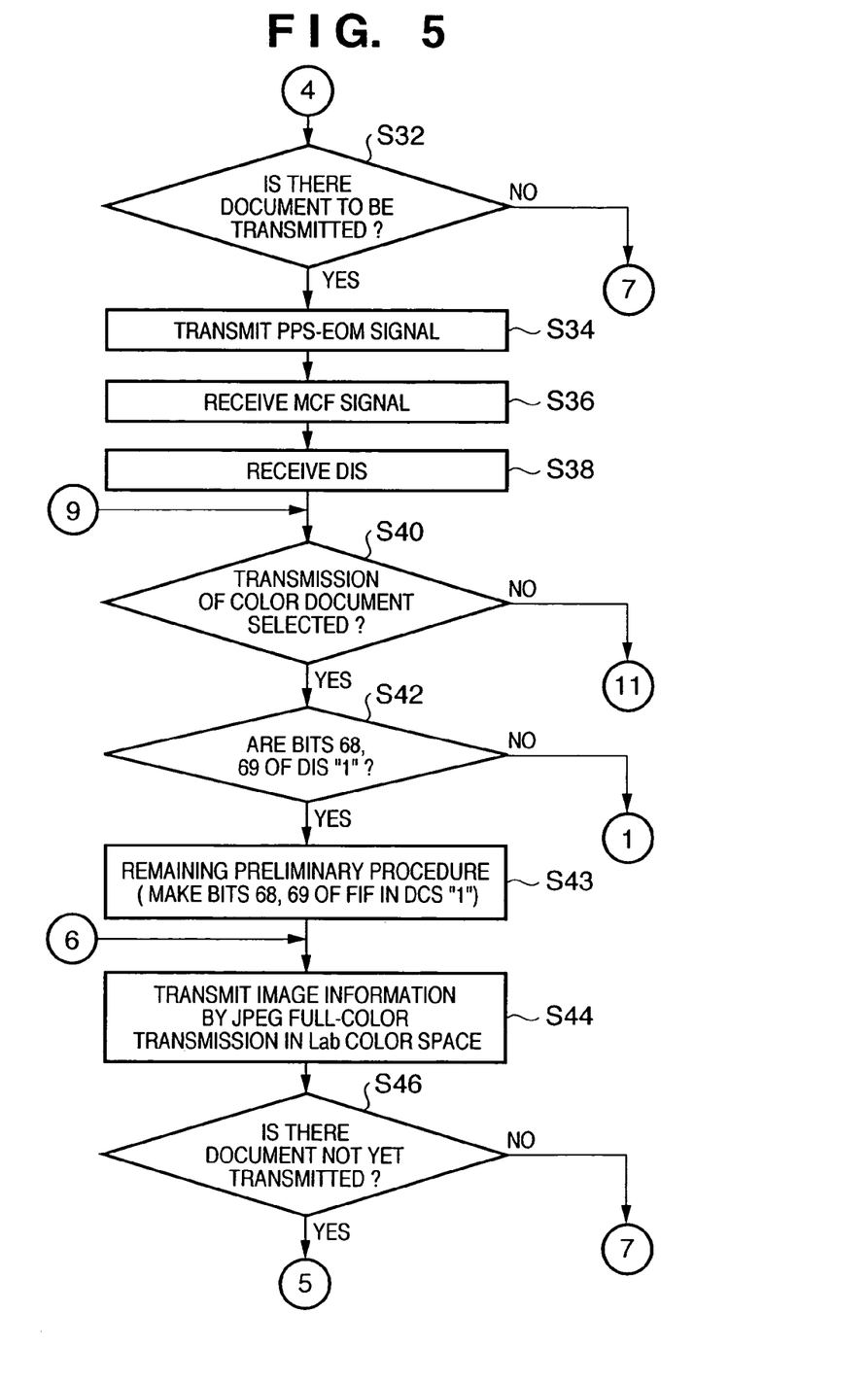
FIG. 5 is a flowchart illustrating processing for facsimile transmission according to this embodiment; DIS/DTC and DCS signals in this embodiment.
Figure 6A:
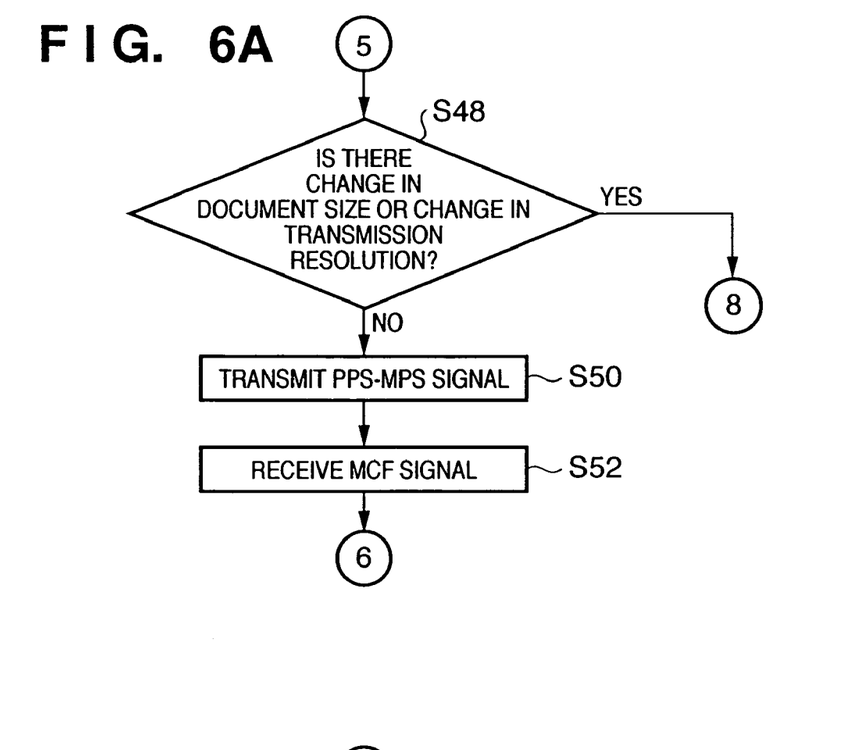
FIGS. 6A and 6B are flowcharts illustrating processing for facsimile transmission according to this embodiment.
Figure 6B:
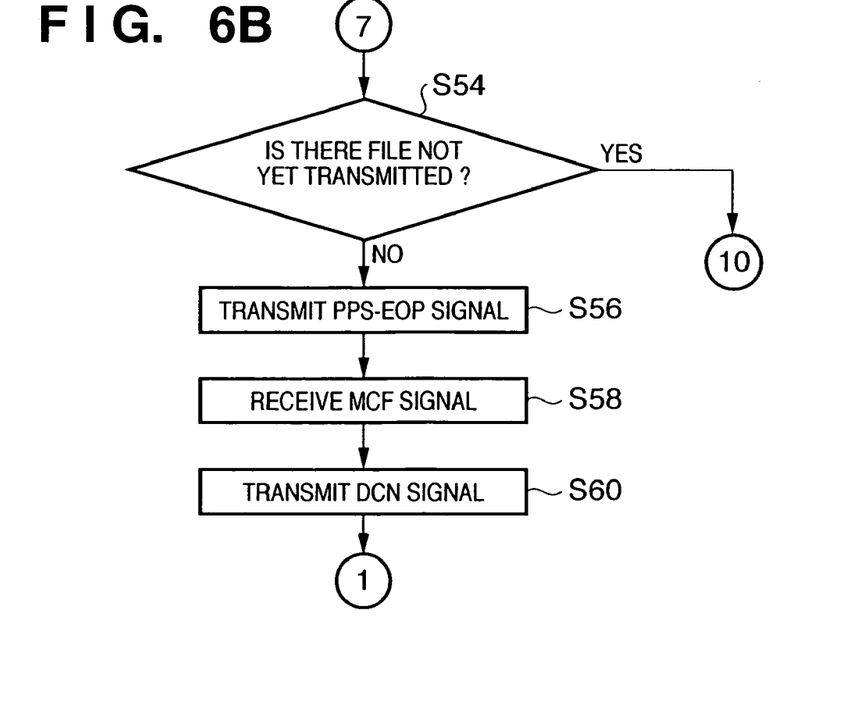

At step S40, information is entered from the control panel and it is determined whether transmission of color information has been selected. Control proceeds to S42 if the answer is "YES" and to step S74 if the answer is "NO".

It is determined at step S42 whether bits 68, 69 of the FIF in the DIS are both "1". Control proceeds to S43 if the answer is "YES" and returns to step S6 if the answer is "NO".

Step S43 represents execution of the remaining part of the preliminary procedure. Here bits 68, 69 of the FIF in the DCS are made "1".

The document image is read as a color image and JPEG-encoded full-color transmission in Lab color space is performed at step S44.

It is determined at step S46 whether there is a document that has not yet been transmitted. Control proceeds to S48 if the answer is "YES" and to step S54 if the answer is "NO".

If control proceeds to step S48 (FIG. 6A), it is determined whether there has been a change in document size or a conversion of transmission resolution (i.e., conversion of the number of pixels in the main-scan direction). Control proceeds to S62 if the answer is "YES" and to step S50 if the answer is "NO". A characterizing feature is that if the number of transmitted pixels in the main-scan direction changes in transmission of a document, the PPS-EOM signal is transmitted. The PPS-MPS signal is transmitted at step S50 and the MCF signal is received at step S52.

If control proceeds to step S54 (FIG. 6B), it is determined whether there is file information that has not yet been transmitted. If the answer is "YES", control proceeds to step S68. If the answer is "NO", control proceeds to step S56, where a PPS-EOP signal is transmitted, then to step S58, where the MCF signal is received, and then to step S60, where a DCN signal is transmitted.

If control proceeds to step S62 (FIG. 7A), the PPS-EOM signal is transmitted, then the MCF signal is received at step S64 and then the DIS is received at step S66.

If control proceeds to step S68 (FIG. 7B), the PPS-EOM signal is transmitted, then the MCF signal is received at step S70, and then the DIS signal is received at step S72.

If control proceeds to step S74 (FIG. 7C), a remaining part of the preliminary procedure is executed. Here bits 68, 69, X of the FIF in the DCS are made "0". This is followed by step S75, at which the document is read as a monochrome image and a monochrome image signal is transmitted.

Figure 7A:
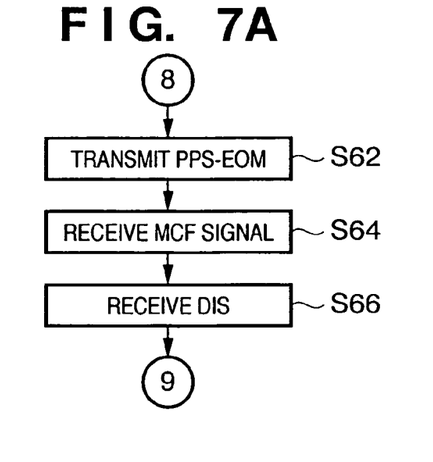
FIGS. 7A to 7C are flowcharts illustrating processing for facsimile transmission according to this embodiment.
Figure 7B:
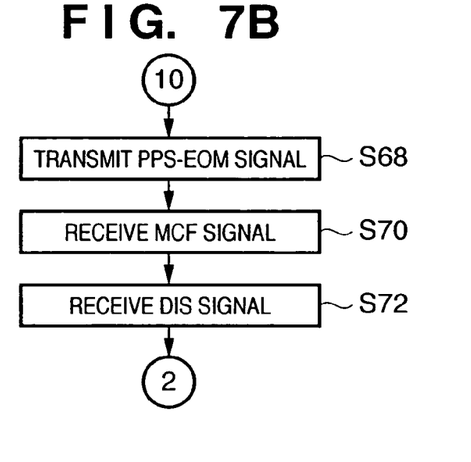
Figure 7C:
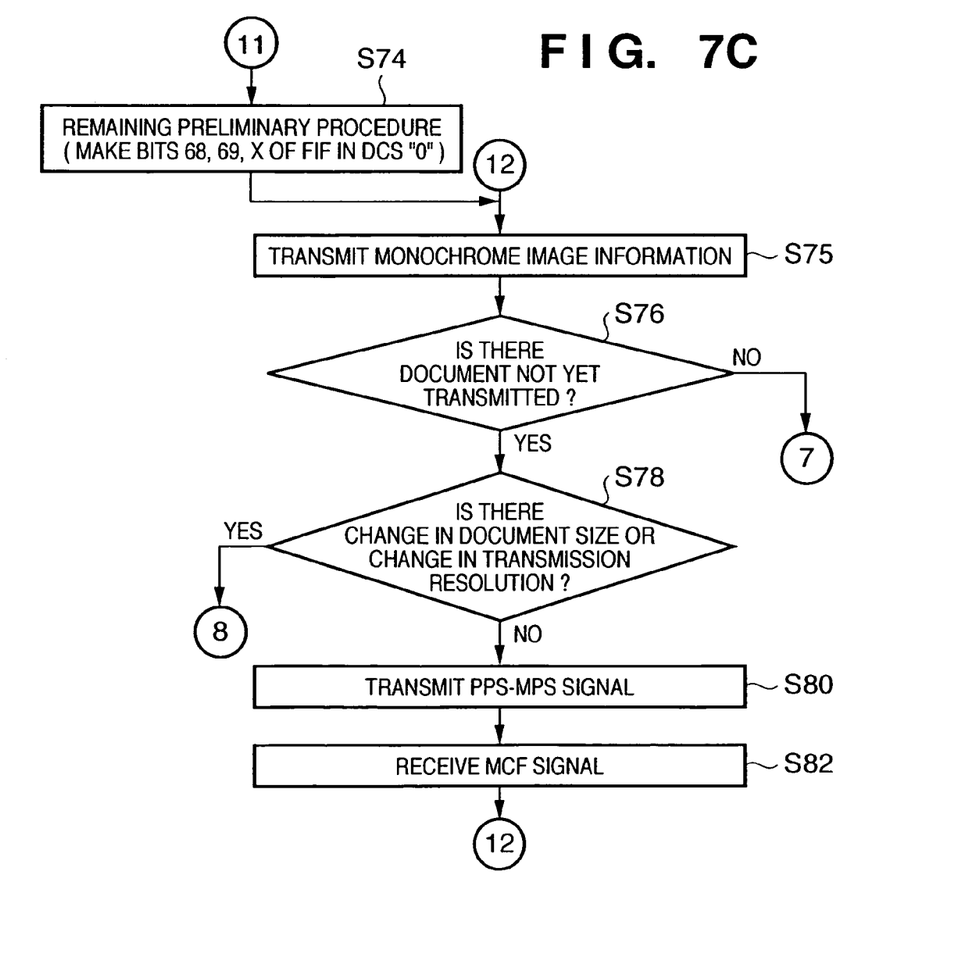

It is determined at step S76 whether there is a document that has not yet been transmitted. Control proceeds to S78 if the answer is "YES" and to step S54 if the answer is "NO".

If control proceeds to step S78, it is determined whether there has been a change in document size or a conversion of transmission resolution (i.e., conversion of the number of pixels in the main-scan direction). Control proceeds to S62 if the answer is "YES" and to step S80 if the answer is "NO". A characterizing feature is that if the number of transmitted pixels in the main-scan direction changes in transmission of a document, the PPS-EOM signal is transmitted.

The PPS-MPS signal is transmitted at step S80 and then the MCF signal is received at step S82.

As described above, a color facsimile apparatus is equipped with means for connecting, to this apparatus, a memory card on which has been stored an image file captured and stored by a digital camera. Image data that has been stored on the card can be transmitted to another communicating party as an image file.

Figure 8:
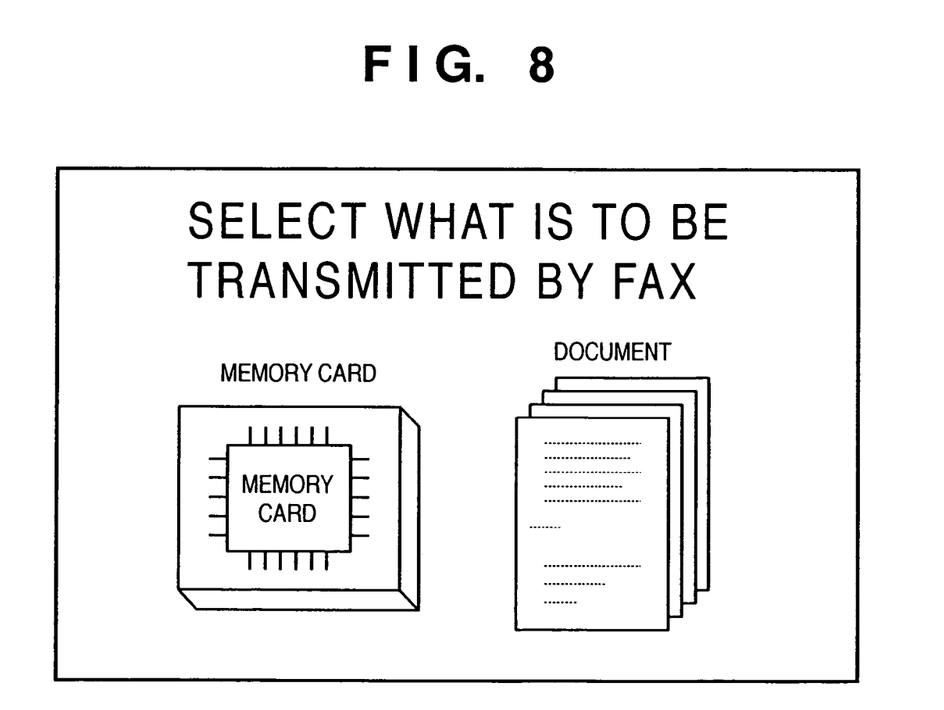
FIG. 8 is a diagram illustrating an example of a display on a control panel at the time of transmission according to this embodiment.

It should be noted that, e.g., a GUI (Graphical User Interface) provided on the control panel is used at the time of facsimile transmission to select transmission of an image file on the memory card connected to the card interface 28 or reading and transmission of a document. FIG. 8 illustrates an example of a display on the control panel (touch-sensitive panel) presented in a case where a memory card has been inserted into the card interface 28.

It is so arranged that the determination at step S18 in FIG. 3 of the above-described processing procedure is made based upon which selection has been made on the screen shown in FIG. 8. However, an arrangement may also be adopted in which when the fact that a memory card has not been inserted into the card interface 28 is sensed by a sensor (not shown), a "NO" decision is rendered at step S18 without waiting for the user to make a selection.

Thus, in accordance with this embodiment, as described above, well-defined procedures are used when transmitting information representing a plurality of files, transmitting information representing a plurality of images, transmitting image information after file information is transmitted, and transmitting file information after image information is transmitted. This makes it possible to reduce problems in mutual communication and to enhance communication reliability.

In accordance with the present invention, as described above, an image that has been captured as by a digital camera can be transmitted in the form of a file by facsimile transmission.

As many apparently widely different embodiments of the present invention can be made without departing from the spirit and scope thereof, it is to be understood that the invention is not limited to the specific embodiments thereof except as defined in the appended claims.

What is claimed is:

1. A communication control method in a facsimile apparatus that is capable of communicating color information, comprising the steps of:

receiving, in a preliminary procedure, notification information from a receiving machine, the notification information indicating whether the receiving machine has a function for receiving JPEG-encoded information in Lab color space, whether it has a function for receiving full-color information in Lab color space, and whether it has a function for receiving JPEG-encoded information in sYCC color space;

notifying the receiving machine of an image to be transmitted being JPEG-encoded in Lab color space, full-color information in Lab color space, or JPEG-encoded information in sYCC color space; and if a JPEG file in sYCC color space stored on a removable storage medium has been specified as an image to be transmitted, transmitting an image in sYCC color space that has been stored on the removable storage medium to the receiving machine as a file on the condition that the received notification information indicates the existence of the function for receiving JPEG-encoded information in sYCC color space, if a plurality of JPEG files in sYCC color space stored on the removable storage medium have been selected as image files to be transmitted, transmitting a PPS-MPS signal at a timing between successive image files to be transmitted, irrespective of the number of pixels in the main-scan direction in respective image file information, and then transmitting a subsequence image file without performing a pre-procedure for the subsequent image file, and if a plurality of document images in Lab color space are transmitted, transmitting a PPS-EOM signal depending on a change of the number of pixels in the main-scan direction between a document image having just been transmitted and a subsequent document image to be transmitted, and then transmitting the subsequent document image after performing the pre-procedure for the subsequent document image, while transmitting a PPS-MPS signal if there is no change in the number of pixels in the main-scan direction between the document image having just been transmitted and the subsequent document image to be transmitted, and then transmitting the subsequent document image without performing the pre-procedure for the subsequent document image.

2. The method according to claim 1, wherein a PPS-EOM signal is transmitted when a document image is transmitted after transmission of the image file.

3. The method according to claim 2, wherein a PPS-EOM signal is transmitted when file information is transmitted after transmission of a document image.

4. A facsimile apparatus that is capable of communicating color information, comprising:

connecting means for connecting a removable storage medium;

means for receiving, in a preliminary procedure, notification information from a receiving machine, the notification information indicating whether the receiving machine has a function for receiving JPEG-encoded information in Lab color space, whether it has a function for receiving full-color information in Lab color space, and whether it has a function for receiving JPEG-encoded information in sYCC color space;

means for notifying the receiving machine of an image to be transmitted being JPEG-encoded in Lab color space, full-color information in Lab color space, or JPEG-encoded information in sYCC color space; and means which is for, if a JPEG file in sYCC color space stored on a removable storage medium has been specified as an image to be transmitted, transmitting an image in sYCC color space that has been stored on the removable storage medium to the receiving machine as a file on the condition that the received notification information indicates the existence of the function for receiving JPEG-encoded information in sYCC color space, if a plurality of JPEG files in sYCC color space stored on the removable storage medium have been selected as images files to be transmitted, transmitting a PPS-MPS at a timing between successive image files to be transmitted, irrespective of the number of pixels in the main-scan direction in respective image file information, and then transmitting a subsequent image file without performing a pre-procedure for the subsequent image file, and if a plurality of document images in Lab color space are transmitted, transmitting a PPS-EOM signal depending on a change of the number of pixels in the main-scan direction between a document image having just been transmitted and a subsequent document image to be transmitted, and then transmitting the subsequent document image after performing the pre-procedure for the subsequent document image, while transmitting a PPS-MPS signal if there is no change in the number of pixels in the main-scan direction between the document image having just been transmitted and the subsequent document image to be transmitted, and then transmitting the subsequent document image without performing the pre-procedure for the subsequent document image.

5. The apparatus according to claim 4, wherein said transmitting means transmits a PPS-EOM signal when a document image is transmitted after transmission of the image file.

6. The apparatus according to claim 5, wherein said transmitting means transmits a PPS-EOM signal is transmitted when file information after transmission of a document image.

7. A communication control method in a facsimile apparatus that is capable of communicating color information, comprising the steps of:

receiving, in a preliminary procedure, notification information from a receiving machine, the notification information indicating whether the receiving machine has a function for receiving JPEG-encoded information in Lab color space, whether it has a function for receiving full-color information in Lab color space, and whether it has a function for receiving JPEG-encoded information in sYCC color space;

notifying the receiving machine of an image to be transmitted being JPEG-encoded information in Lab color space, full-color information in Lab color space, or JPEG-encoded information in sYCC color space; and transmitting, if a plurality of JPEG-encoded images in sYCC color space are transmitted, a PPS-MPS signal to the receiving machine at a timing between successive images, in spite of a number of pixels in a main scanning direction between an image having just been transmitted and a subsequent image to be transmitted, and then transmitting the subsequent image without performing a pre-procedure for the subsequent image, while transmitting, if a plurality of JPEG-encoded images in Lab color space are transmitted, a PPS-EOM signal to the receiving machine if there is a change in number of pixels of transmitted images in the main-scan direction between the image having just been transmitted and the subsequent image to be transmitted, and then transmitting the subsequent image after performing the pre-procedure for the subsequent image, while transmitting a PPS-MPS signal to the receiving machine at the timing between successive images if a number of pixels in a main scanning direction between the image having just been transmitted and the subsequent image to be transmitted is the same, and then transmitting the subsequent image without performing the pre-procedure.

8. A facsimile apparatus that is capable of communicating color information, comprising:

means for receiving, in a preliminary procedure, notification information from a receiving machine, the notification information indicating whether the receiving machine has a function for receiving JPEG-encoded information in Lab color space, whether it has a function for receiving full-color information in Lab color space, and whether it has a function for receiving JPEG-encoded information in sYCC color space;

means for notifying the receiving machine of an image to be transmitted being JPEG-encoded information in Lab color space, full-color information in Lab color space, or JPEG-encoded information in sYCC color space; and means for transmitting, if a plurality of JPEG-encoded images in sYCC color space are transmitted, a PPS-MPS signal to the receiving machine at a timing between successive images, in spite of a number of pixels in a main scanning direction between an image having just been transmitted and a subsequent image to be transmitted, and then transmitting the subsequent image without performing a pre-procedure for the subsequent image, while transmitting, if a plurality of JPEG-encoded images in Lab color space are transmitted, a PPS-EOM signal to the receiving machine if there is a change in number of pixels of transmitted images in the main-scan direction between the image having just been transmitted and the subsequent image to be transmitted, and then transmitting the subsequent image after performing the pre-procedure for the subsequent image, while transmitting a PPS-MPS signal to the receiving machine at the timing between successive images if a number of pixels in a main scanning direction between the image having just been transmitted and the subsequent image to be transmitted is the same, and then transmitting the subsequent image without performing the pre-procedure.

* * * * *

UNITED STATES PATENT AND TRADEMARK OFFICE
CERTIFICATE OF CORRECTION

PATENT NO.        : 7,400,428 B2  
APPLICATION NO.   : 10/684385  
DATED             : July 15, 2008  
INVENTOR(S)       : Takehiro Yoshida Page 1 of 1

It is certified that error appears in the above-identified patent and that said Letters Patent is hereby corrected as shown below:

SHEET 4:

Figure 4, "CHANGE" (second occurrence) should read --CHANGE)--.

COLUMN 7:

Line 31, "subsequence" should read --subsequent--.

COLUMN 8:

Line 13, "images" should read --image--; and "PPS-MPS" should read --PPS-MPS signal--;  
    Line 38, "is transmitted" should be deleted; and  
    Line 39, "information" should read --information is transmitted--.

Signed and Sealed this

Second Day of December, 2008

JON W. DUDAS  
*Director of the United States Patent and Trademark Office*